US008804748B2

(12) United States Patent
Jia et al.

(10) Patent No.: US 8,804,748 B2
(45) Date of Patent: Aug. 12, 2014

(54) HITLESS NODE INSERTION FOR ETHERNET NETWORKS

(75) Inventors: Zhiping Jia, Beijing (CN); Dudu Akler, Tel Mond (IL); Lior Shabtay, Ramat Gan (IL)

(73) Assignee: Nokia Siemens Networks Ethernet Solutions Ltd., Hod Hasharon (IL)

( * ) Notice: Subject to any disclaimer, the term of this patent is extended or adjusted under 35 U.S.C. 154(b) by 72 days.

(21) Appl. No.: 13/076,498

(22) Filed: Mar. 31, 2011

(65) Prior Publication Data

US 2012/0250695 A1 Oct. 4, 2012

(51) Int. Cl.
 H04L 12/28 (2006.01)
(52) U.S. Cl.
 USPC ............ 370/400; 370/254; 370/255; 370/465
(58) Field of Classification Search
 None
 See application file for complete search history.

(56) References Cited

U.S. PATENT DOCUMENTS

| | | | | |
|---|---|---|---|---|
| 6,731,707 | B1 * | 5/2004 | Olofsson et al. | 375/356 |
| 7,093,283 | B1 * | 8/2006 | Chen et al. | 726/6 |
| 2002/0116485 | A1 * | 8/2002 | Black et al. | 709/223 |
| 2003/0041237 | A1 * | 2/2003 | Mcelroy et al. | 713/151 |
| 2003/0081620 | A1 * | 5/2003 | Danner et al. | 370/400 |
| 2009/0316571 | A1 | 12/2009 | Rose | |
| 2010/0135154 | A1 | 6/2010 | Cheung et al. | |
| 2012/0250695 | A1 * | 10/2012 | Jia et al. | 370/400 |

FOREIGN PATENT DOCUMENTS

EP 2020782 A1 2/2009

OTHER PUBLICATIONS

RFC 4761 Virtual Private LAN Service (VPSL) Using BGP for Auto-Discovery and Signaling, Network Working Group K. Kompella et al .Jan. 2007, pp. 1-29.
RFC 4762 Virtual Private LAN Service (VPLS) Using Label Distribution Protocol (LDP) Signaling, Network Working Group, M. Lasserre et al. Jan. 2007, pp. 1-32.
IEEE Std 802.1Q™—2005 IEEE Standard for Local and metropolitan area networks Virtual Bridged Local AreaNetworks (Incorporates IEEE Std 802.1Q-1998, IEEE Std 802.1u™—2001 IEEE Std 802.1v™-2001, and IEEE Std 802.1s™-2002) May 19, 2006, pp. 1-303.
802.1ad Virtual Bridged Local Area Networks, Amendment 4: Provider BridgesIEEE Std 802.1ad™—2005 (Amendment to IEEE Std 802.1Q™—2005) May 26, 2006, pp. 1-74.
Y.1731 Series Y: Global Information Infrastructure, Internet Protocol Aspects and Next-Generation Networks Internet protocol aspects—Operation, administration and maintenance, OAM functions and mechanisms for Ethernet based networks, ITU-T Y.1731(Feb. 2008) Telecommunication Standardization Sector of ITU, pp. 1-82.

(Continued)

Primary Examiner — Robert Wilson
(74) Attorney, Agent, or Firm — Laurence A. Greenberg; Werner H. Stemer; Ralph E. Locher

(57) ABSTRACT

A novel and useful hitless node insertion mechanism for configuring a new node to be inserted into an Ethernet network. The mechanism comprises pre-configuring the new node into a partially configured state, disconnecting a network link where the new node is to be inserted and connecting the new node to at least one end of the disconnected link. All data traffic received from neighboring nodes is then blocked and fake signal failure (SF) messages are generated and sent if Ethernet Ring Protection (ERP) messages are detected. An in-band management port is then selected and a configuration from a Network Management System (NMS) is received. Once configuration of the said new node is complete, the new node is set to a fully configured state.

24 Claims, 11 Drawing Sheets

(56) References Cited

OTHER PUBLICATIONS

EEE Std 802.1ag™—2007 IEEE Standard for Local and metropolitan area networks—Virtual Bridged Local Area Networks Amendment 5: Connectivity Fault Management (Amendment to IEEE Std 802.1Q™—2005 as amended by IEEE Std 802.1ad™—2005 and IEEE Std 802.1ak™—2007), pp. 1-130.

IEEE Std 802.1ah™—2008 IEEE Standard for Local and metropolitan area networks—Virtual Bridged Local Area Networks Amendment 7: Provider Backbone Bridges(Amendment to IEEE Std 802.1Q™—2005), pp. 1-121.

* cited by examiner

HITLESS NODE INSERTION FOR ETHERNET NETWORKS

TECHNICAL FIELD

The disclosure relates generally to data communication systems and more particularly relates to a system and method for hitless node insertion for use in Ethernet networks.

BACKGROUND

The growth in demand for telecommunication services is increasing at an ever-quickening pace. The majority of the demand is being driven by the explosion in the use of the Internet and a steady stream of new applications being introduced which further increase the demand for increased bandwidth. With time, a smaller and smaller portion of Internet traffic is carried by circuit switched transport facilities. In the case of Metropolitan Area Networks (MANs), a significant part of the traffic is transported over SONET/SDH based networks most of which were originally resigned for voice traffic. With time, more and more customers are using the networks for transporting data rather than voice.

The requirements for networked communications within the user community have changed dramatically over the past two decades. Several notable trends in the user community include (1) the overwhelming domination of Ethernet as the core networking media around the world; (2) the steady shift towards data-oriented communications and applications; and (3) the rapid growth of mixed-media applications. Such applications include everything from integrated voice/data/video communications to the now commonplace exchanges of MP3 music files and also existing voice communications which have migrated heavily towards IP/packet-oriented transport.

Ethernet has become the de facto standard for data-oriented networking within the user community. This is true not only within the corporate market, but many other market segments as well. In the corporate market, Ethernet has long dominated at all levels, especially with the advent of high-performance Ethernet switching. This includes workgroup, departmental, server and backbone/campus networks. Even though many of the Internet Service Providers (ISPs) in the market today still base their WAN-side communications on legacy circuit oriented connections (i.e. supporting Frame Relay, xDSL, ATM, SONET) in addition to Ethernet in a significant part of the newer installations, their back-office communications are almost exclusively Ethernet. In the residential market, most individual users are deploying 10 or 100 Mbps Ethernet within their homes to connect PCs to printers and to other PCs (in fact, most PCs today ship with internal Ethernet cards) even though the residential community still utilizes a wide range of circuit-oriented network access technologies.

The use of Ethernet, both optical and electrical based, is increasing in carrier networks due to advantages of Ethernet and particularly Optical Ethernet, namely its ability to scale from low speeds to very high rates and its commodity-oriented nature. With the rapid increase in the demand for user bandwidth, and the equally impressive increase in the performance of Ethernet with the LAN environment, the demand for Metropolitan network performance is rapidly increasing. In response, there has been a massive explosion in the amount of fiber being installed into both new and existing facilities. This is true for both the corporate and residential markets.

Virtual private LAN service (VPLS) is a way to provide Ethernet based multipoint to multipoint communication over Internet Protocol (IP)/Multiprotocol Label Switching (MPLS) networks. It allows geographically dispersed sites to share an Ethernet broadcast domain by connecting sites through pseudo-wires. Example technologies that can be used as pseudo-wire include Ethernet over MPLS, L2TPv3, etc. Two IETF standards that track RFCs describing VPLS establishment include RFC 4761 "Virtual Private LAN Service (VPLS) Using BGP for Auto-Discovery and Signaling" and RFC 4762 "Virtual Private LAN Service (VPLS) Using Label Distribution Protocol (LDP) Signaling".

VPLS is a virtual private network (VPN) technology which allows any-to-any (multipoint) connectivity. In a VPLS, the local area network (LAN) at each site is extended to the edge of the provider network. The provider network then emulates a switch or bridge to connect all of the customer LANs to create a single bridged LAN.

A VPLS creates an emulated LAN segment for a given set of users. It provides a layer 2 broadcast domain that is capable of learning and forwarding using Ethernet MAC addresses for a given set of users.

Today, Ethernet is the predominant technology used for Local Area Network (LAN) connectivity and is gaining acceptance as an access technology as well. This is true especially in Metropolitan Area Networks (MANs) and Wide Area Networks (WANs). In a typical scenario, an Ethernet port connects a customer to the Provider Edge (PE) device. Customer traffic is subsequently mapped to a specific MPLS-based Layer 2 Virtual Private Network (VPN).

Traditional LANs provide unicast, broadcast and multicast services. Locations that belong to the same broadcast domain and that are connected via an MPLS network expect broadcast, multicast and unicast traffic to be forwarded to the proper locations. This requires MAC address learning on a per LSP basis, forwarding unicast destination traffic according to the learned information, packet replication across LSPs for multicast/broadcast traffic and for flooding of unknown unicast destination traffic.

A main goal of Virtual Private LAN Services (VPLS) is to provide connectivity between customer sites situated in the MAN or WAN as if they were connected via a LAN. To accomplish this, a major attribute of Ethernet must be provided, namely the flooding of broadcast traffic, multicast traffic, and traffic with unknown destination MAC addressed to all ports. To provide flooding within a VPLS, all unicast unknown address, broadcast and multicast frames are flooded over the corresponding "pseudo-wires" to all relevant provider edge nodes that participate in the VPLS. Note that multicast packets are a special case and are not necessarily flooded to all VPN members. A pseudo-wire is a made up of a pair of unidirectional virtual circuit Label Switched Paths (LSPs). Throughout this document, the terms pseudo-wire and transport-entity are used to denote a point-to-point logical link connecting different nodes in the network, regardless of the technology used for its implementation, e.g., MPLS, etc. Depending on the technology, the pseudo-wire may be an MPLS-VC, a point-to-point Virtual LAN (VLAN)-based trail, an ATM-VC, etc.

A provider edge node uses different techniques to associate packets received from the client with connections. Example techniques include port mapping and VLAN mapping in which the received packet is associated with a connection according to the provider edge device port from which it was received or according to the port from which it was received as well as the VLAN with which it is tagged, respectively. Packets mapped to a VPLS connection, are forwarded to one or more of the sites associated with that particular VPLS connection. In case of a VPLS connection, the forwarding is performed by bridging-capable nodes throughout the network, that bridge between pseudo-wires dedicated to that VPLS. The pseudo-wires are point-to-point 'sub-connections' of that VPLS, functioning to connect the bridging-capable nodes. These bridging capable nodes must be able to first associate the received packet with a VPLS and then, within the context of the VPLS, associate a destination MAC address (or a destination MAC-address and VLAN-tag value) with a pseudo-wire comprising that VPLS in order to forward a packet. It is not practical to require these provider nodes to statically configure an association of every possible destination MAC address with a pseudo-wire. Thus, a bridging mechanism is required to dynamically learn MAC addresses (or MAC-address and VLAN pairs) on both physical ports and virtual circuits and to forward and replicate packets across both physical ports and pseudo-wires to which they are associated.

Provider edge (PE) devices participating in a VPLS-based VPN must appear as an Ethernet bridge to connected customer edge (CE) devices. Received Ethernet frames must be treated in such a way as to ensure CEs can be simple Ethernet devices. When a PE receives a frame from a CE, it inspects the frame and learns the source MAC address, storing it locally along with LSP routing information. It then checks the frame's destination MAC address. If it is a broadcast or multicast frame, or the MAC address is not known to the PE, it floods the frame to all PEs in the mesh.

Bridging functionality operates on the original Layer 2 portion of the packet. The bridge functions to learn new source MAC addresses of ingress packets and to associate them with the outbound pseudo-wire it is to be sent out on.

SUMMARY

There is thus provided in accordance with the invention a method of configuring a new node to be inserted into an Ethernet network, the method comprising pre-configuring the new node into a partially configured state, disconnecting a network link where the new node is to be inserted and connecting the new node to at least one end of the disconnected link, blocking all data traffic received from neighboring nodes, but trapping Layer 2 Control Protocol (L2CP) traffic and in-band traffic destined to the new node, generating and sending fake signal failure (SF) messages if Ethernet Ring Protection (ERP) messages are detected, selecting an in-band management port and receiving a configuration from a Network Management System (NMS) and once configuration of the new node is complete, setting the new node to a fully configured state.

There is also provided in accordance with the invention a method of configuring a new node to be inserted into an Ethernet network, the method comprising pre-configuring the new node into a partially configured state and detecting insertion into the Ethernet network, blocking all service traffic received from neighboring nodes except Layer 2 Control Protocol (L2CP) traffic or in-band traffic destined to the new node, generating and sending false signal failure (SF) messages to keep one or more Ring Protection Links (RPLs) unblocked while the new node is in the partially configured state if Ethernet Ring Protection (ERP) messages are detected, selecting one of a plurality of bridge ports in the new node as an in-band management port and receiving a configuration from a Network Management System (NMS) and once configuration of the new node is complete, setting the new node to a fully configured state and beginning to handle service traffic.

There is further provided in accordance with the invention a network device for use in a carrier Ethernet network comprising a plurality of network ports for interfacing to one or more communication links, means for receiving pre-configuration information for placing the said network device into a partially configured state and detecting connection of the network device to at least one end of a disconnected link, means for blocking all data traffic received from neighboring nodes, but tramping Layer 2 Control Protocol (L2CP) traffic and in-band traffic destined to said network device, means for generating and sending fake signal failure (SF) messages if Ethernet Ring Protection (ERP) messages are detected, means for selecting an in-band management port and means for receiving a configuration from a Network Management System (NMS) and once configuration of the network device is complete, setting the node network device to a fully configured state.

There is also provided a network device to be inserted into an Ethernet network. The network device includes: means for pre-configuring the network device into a partially configured state and detecting insertion into said Ethernet network, means for blocking all service traffic received from neighboring nodes except Layer 2 Control Protocol (L2CP) traffic and in-band traffic destined to the network device, means for generating and sending false signal failure (SF) messages to keep one or more Ring Protection Links (RPLs) unblocked while the network device is in the partially configured state if Ethernet Ring Protection (ERP) messages are detected, means for selecting one of a plurality of bridge ports in the network device as an in-band management port, and means for receiving a configuration from a Network Management System (NMS) and, once configuration of the network device is complete, setting the network device to a fully configured state and beginning to handle service traffic.

BRIEF DESCRIPTION OF THE DRAWINGS

The mechanism is herein described, by way of example only, with reference to the accompanying drawings, wherein.

DETAILED DESCRIPTION

Figure 1:
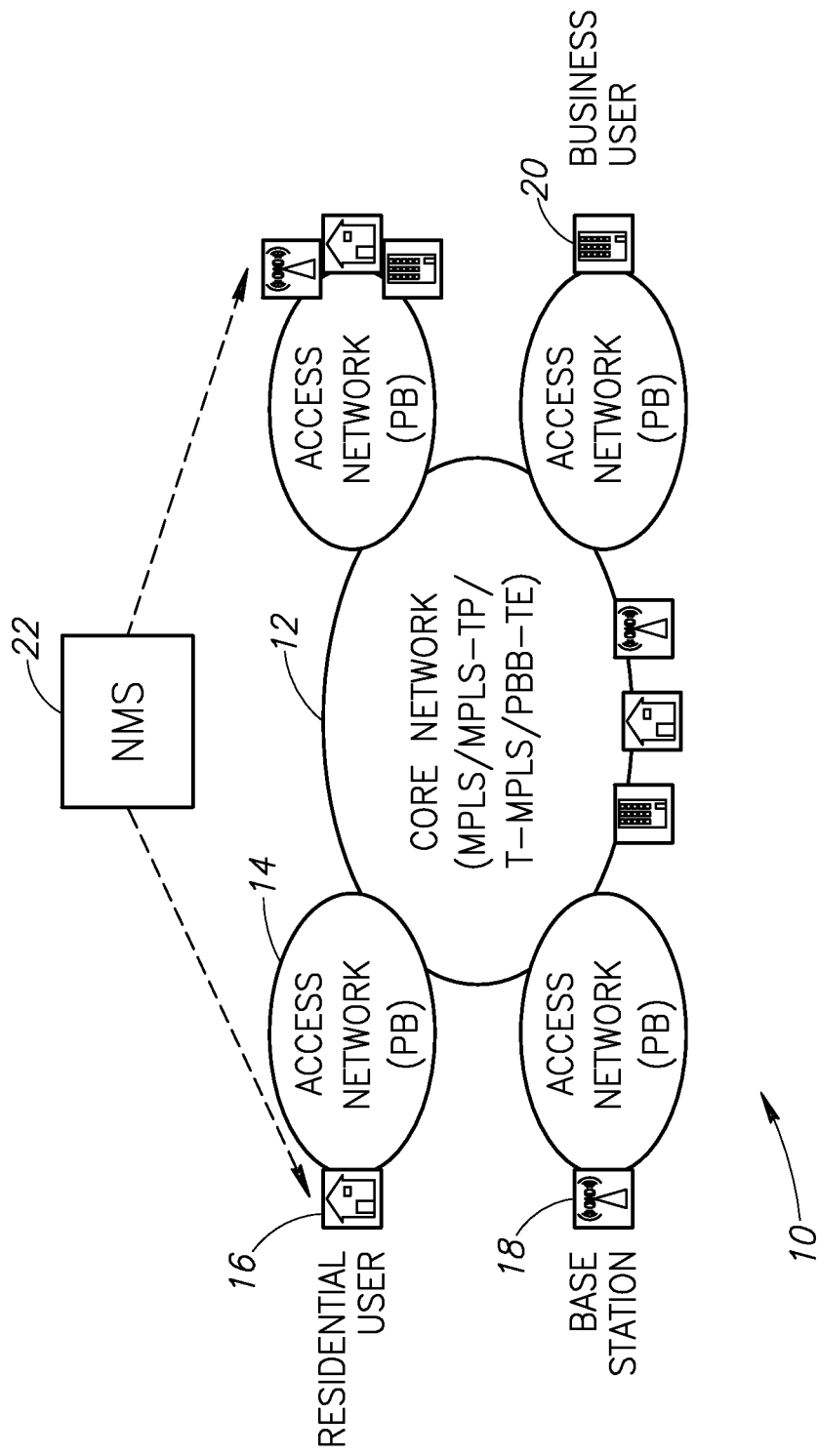
FIG. 1 is a diagram illustrating an example carrier Ethernet network architecture incorporating an MPLS core.

The mechanism will now be described more fully hereinafter with reference to the accompanying drawings, in which preferred embodiments of the mechanism are shown. The mechanism may, however, be embodied in many different forms and should not be construed as limited to the embodiments set forth herein. Rather, these embodiments are provided so that this disclosure will be thorough and complete, and will fully convey the scope of the mechanism to those skilled in the art. Like numbers refer to like elements throughout, and prime notation is used to indicate similar elements in alternative embodiments.

To aid in illustrating the principles of the mechanism, an example network is presented in connection with the hitless node insertion mechanism. It is not intended, however, that the mechanism be limited to the configurations and embodiments described herein. It is appreciated that one skilled in the networking, electrical and/or software arts may apply the principles of the mechanism to numerous other types of networking devices and network configurations as well, including other types of synchronous data streams and asynchronous transport networks without departing from the scope of the mechanism.

Many aspects of the mechanism described herein may be constructed as software objects that execute in embedded devices as firmware, software objects that execute as part of a software application on either an embedded or non-embedded computer system running a real-time operating system such as Windows mobile, WinCE, Symbian, OSE, Embedded LINUX, etc., or non-real time operating systems such as Windows, UNIX, LINUX, etc., or as soft core realized HDL circuits embodied in an Application Specific Integrated Circuit (ASIC) or Field Programmable Gate Array (FPGA), or as functionally equivalent discrete hardware components.

Throughout this document, the terms packet and frame are used interchangeably and are intended to denote a protocol data unit (PDU) adapted to transport data and/or control information from one point to another. References are made to Ethernet frames, IP packets, etc. which are example protocol data units (PDUs) associated with various networks such as Ethernet, H.323, ISO OSI TCP/IP protocol stack. It is appreciated, however, that the mechanism may be adapted for use in other types of networks that transmit other types of PDUs as well. The principles of MAC based transmission as described herein are not limited to Ethernet MAC devices and can be applied to other types of Layer 2 protocols and devices as well.

The most popular types of VPLS-spokes are VLAN-spokes and MPLS-spokes. A VLAN spoke is a spoke site that resides in a non-MPLS, VLAN enabled network device (e.g., according to IEEE 802.1Q or 802.1ad). A MPLS spoke is a spoke site that resides in an MPLS enabled network device. Such a spoke is connected to one or two VPLS VSIs through MPLS transport entities (e.g., pseudo-wires).

Note that throughout this document, the term communications transceiver or device is defined as any apparatus or mechanism adapted to transmit, receive or transmit and receive information through a medium. The communications device or communications transceiver may be adapted to communicate over any suitable medium, including wireless or wired media.

The word 'exemplary' is used herein to mean 'serving as an example, instance, or illustration.' Any embodiment described herein as 'exemplary' is not necessarily to be construed as preferred or advantageous over other embodiments.

Some portions of the detailed descriptions which follow are presented in terms of procedures, logic blocks, processing, steps, and other symbolic representations of operations on data bits within a computer memory. These descriptions and representations are the means used by those skilled in the data processing arts to most effectively convey the substance of their work to others skilled in the art. A procedure, logic block, process, etc., is generally conceived to be a self-consistent sequence of steps or instructions leading to a desired result. The steps require physical manipulations of physical quantities. Usually, though not necessarily, these quantities take the form of electrical or magnetic signals capable of being stored, transferred, combined, compared and otherwise manipulated in a computer system. It has proven convenient at times, principally for reasons of common usage, to refer to these signals as bits, bytes, words, values, elements, symbols, characters, terms, numbers, or the like.

It should be born in mind that all of the above and similar terms are to be associated with the appropriate physical quantities they represent and are merely convenient labels applied to these quantities. Unless specifically stated otherwise as apparent from the following discussions, it is appreciated that throughout the mechanism, discussions utilizing terms such as 'processing,' 'computing,' 'calculating,' 'determining,' 'displaying' or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices or to a hardware (logic) implementation of such processes.

The flowchart and block diagrams in the Figures illustrate the architecture, functionality, and operation of possible implementations of systems, methods and computer program products according to various embodiments of the present mechanism. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Note that the mechanism can take the form of an entirely hardware embodiment, an entirely software embodiment or an embodiment containing a combination of hardware and software elements. In one embodiment, a portion of the mechanism can be implemented in software, which includes but is not limited to firmware, resident software, object code, assembly code, microcode, etc.

Furthermore, the mechanism can take the form of a computer program product accessible from a computer-usable or computer-readable medium providing program code for use by or in connection with a computer or any instruction execution system. For the purposes of this description, a computer-usable or computer readable medium is any apparatus that can contain, store, communicate, propagate, or transport the program for use by or in connection with the instruction execution system, apparatus, or device, e.g., floppy disks, removable hard drives, computer files comprising source code or object code, flash semiconductor memory (embedded or removable in the form of, e.g., USB flash drive, SDIO module, etc.), ROM, EPROM, or other semiconductor memory devices.

Example Carrier Ethernet Network

Carrier Ethernet Networks (CENs), which are well known for their low price per bits in bandwidth, are increasingly being recognized and widely deployed around the world. A diagram illustrating an example carrier Ethernet network architecture incorporating an MPLS core is shown in FIG. 1. The example Carrier Ethernet Network (CEN), generally referenced 10, comprises a core network 12 and a plurality of access networks 14 connecting users such as residential 16, base stations 18 and business users 20, and a Network Management System (NMS) 22. The core network 12 may use various technologies such as MPLS, MPLS-TP, T-MPLS or PBB-TE. The access network usually comprises Provider Bridging (PB), also known as Q-in-Q. Note that throughout this document, the term E-domain is used to refer to PB based access-networks.

The Network Management System (NMS) 22 is operative to manage both the core and access devices from end to end. The management network can be either in-band or out-of-band. In-band management makes use of the service network to transfer the management traffic, while out-of-band management needs a separate Data Communications Network (DCN) dedicated for management purposes. Therefore, in-band management has an advantage over out-of-band management in terms of saving capital expenditures for operators.

The Metro Ethernet Forum (MEF) defines three types of carrier Ethernet services, namely E-Line, Ethernet Local Area Network (E-LAN) and Ethernet Tree (E-Tree), which can be implemented via various underlying technologies, such as VPWS, VPLS, Provider Bridging and PBB-TE, etc.

In provider bridged networks defined by the IEEE 802.1ad standard, each service is identified by a VLAN. For E-LAN/E-Tree service, a Layer 2 control protocol (L2CP), i.e. MSTP or ERP, is used to prevent loops and provide resiliency. In one embodiment, for E-Line service, VLAN-based provisioned traffic-engineered paths are used which require that these VLANs not be effected (i.e. blocked) by the L2CP. In the Carrier Ethernet Transport (CET) network, the service is provisioned with either end-to-end protection or no protection. For end-to-end protected E-Line services, two disjoint paths are provisioned through the network where each path is guaranteed not to have any loops during provisioning, and the L2CP never blocks the paths on any port. PBB-TE is a standard that defines a similar behavior, i.e. provisioned traffic engineered paths that are not affected by the L2CP.

The E-Tree service is the service described by MEF as a 'rooted multipoint EVC', similar to an E-LAN service which is described by MEF as a 'multipoint-to-multipoint EVC'. In operation, E-Tree service provides connectivity between End Points defined as 'leaves' and End Points defined as 'Roots' or between End Points that are defined as 'Roots'. E-Tree service, however, denies connectivity between End Points defined as 'Leaves'. Thus, leaves can communicate with roots, roots can communicate with leaves and roots can communicate with other roots, but leaves cannot communicate with other leaves. In other words, ingress service frames at a Root UNI can be delivered to one or more of any of the other UNIs in the service. Ingress service frames at a Leaf UNI can only be delivered to one or more Root UNIs of the service. In addition, a single E-Tree service may have more than one root.

A VPLS service is constructed of Virtual Switch Instances (VSIs) placed on one or more MPLS PE devices. A full mesh of Pseudo-Wires (PWs) between the VSIs provides full connectivity between them in order to provide E-LAN functionality. Endpoints of the service either reside on the PE devices or connected to the VSI through the network, for example through a point-to-point VLAN-spoke.

In one embodiment, the NMS configures newly inserted devices after having already been inserted into the network rather than requiring manual configuration of the devices beforehand. In this case, the NMS can automatically configure the device according to its position in the network topology, and thus avoid manual configuration work and configuration mistakes. The invention provides a mechanism to safely insert a non-configured node into an Ethernet network. The following conditions are assumed about the network.

The network comprises an Ethernet network (i.e. IEEE-802.1Q, IEEE-802.1ad, or IEEE-802.1ah), using ERP or MSTP as the L2CP (hereinafter referred to as an ERP or MSTP network, respectively). The in-band management plane is used to provide the connectivity between the NMS and network elements (NEs). The management protocol comprises any suitable protocol such as SNMP, which belongs to the IP protocol family. For the core network, the management data plane is based on IP forwarding, and the control plane can use any desired routing protocol, i.e. OSFP. For the access network, the management data plane is based on a management VLAN; the control plane comprises a L2CP; and the PE(s) of the core network act as static IP gateway(s) for connecting the management plane of the access network with that of the core network. For dual homed access networks, Virtual Router Redundancy Protocol (VRRP) is used to provide IP gateway redundancy.

Figure 2A:
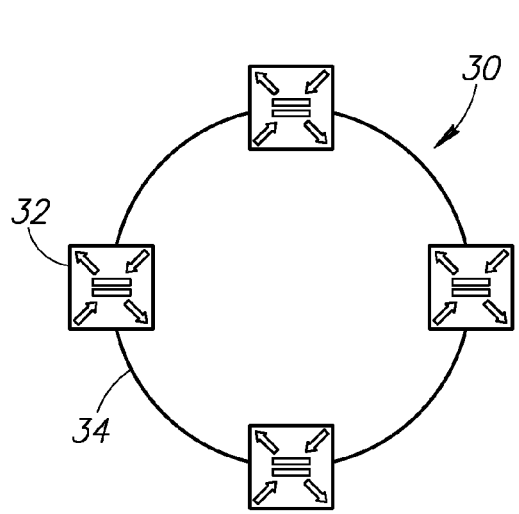
FIG. 2A is a diagram illustrating an example single ring network.
Figure 2B:
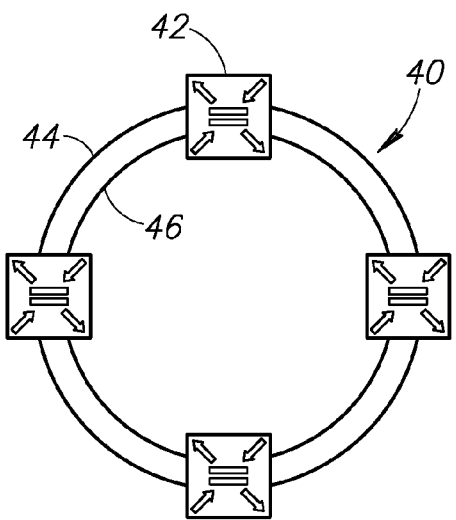
FIG. 2B is a diagram illustrating an example dual ring network.
Figure 2C:
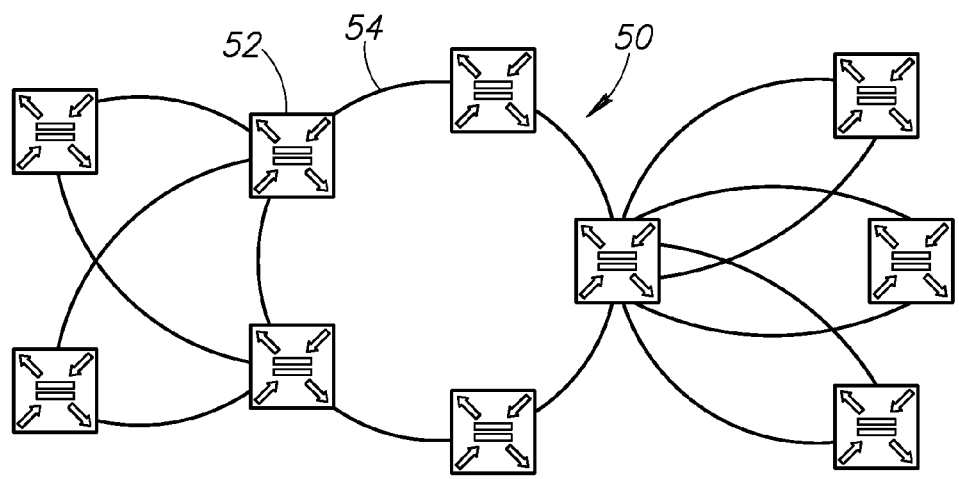
FIG. 2C is a diagram illustrating an example network incorporating a tree of rings.
Figure 2D:
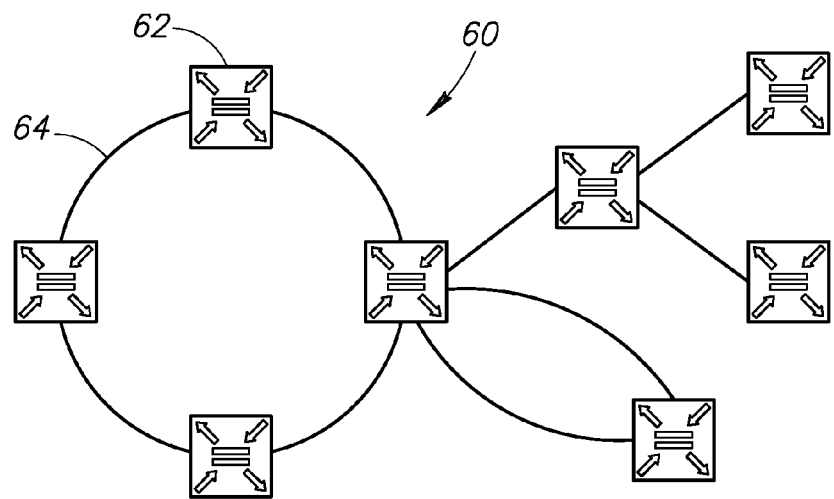
FIG. 2D is a diagram illustrating an example network incorporating a combination of rings and trees.
Figures 2E, 2F:
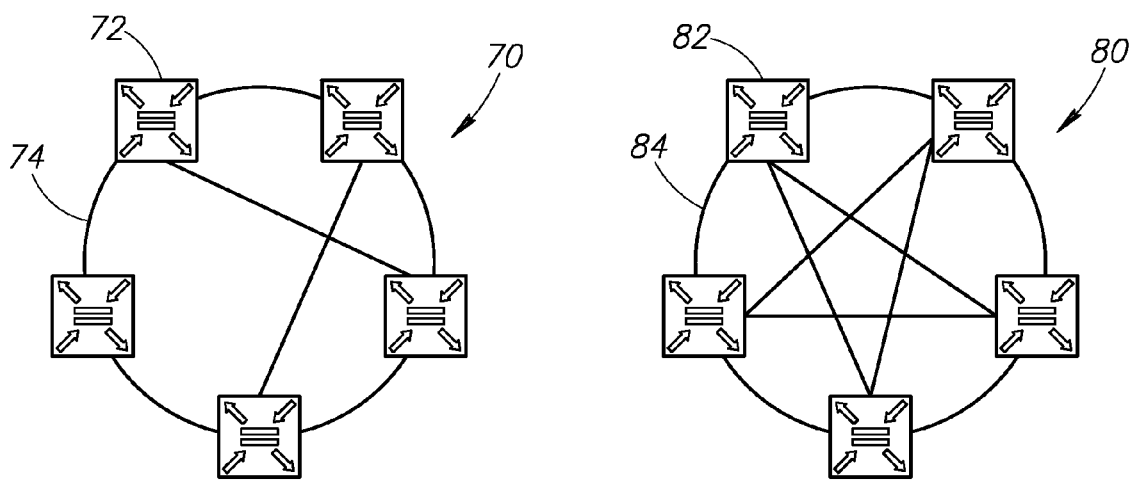
FIG. 2E is a diagram illustrating an example partial mesh network.
FIG. 2F is a diagram illustrating an example full mesh network.

In addition, the NMS is connected to the network and is able to automatically generate the needed configuration for the newly inserted node. For a network (or a sub-network) using MSTP as the L2CP, the physical layer topology may comprise any topology, e.g., single ring 30 (FIG. 2A) comprising a plurality of NEs 32 and links 34, dual ring 40 (FIG. 2B) comprising a plurality of NEs 42 and links 44, 46, tree of rings 50 (FIG. 2C) comprising a plurality of NEs 52 and links 54, partial-mesh 70 (FIG. 2E) comprising a plurality of NEs 72 and links 74, full-mesh 80 (FIG. 2F) comprising a plurality of NEs 82 and links 84, etc. For a network (or a sub-network) using ERP as the L2CP, the physical layer topology may comprise a single ring, dual ring, a tree of rings, combination of rings and trees 60 (FIG. 2D) comprising a plurality of NEs 62 and links 64, etc.

The default configuration of the non-configured node to be inserted into the network can be of the following six types:
1. A non-configured node that accepts and forwards all VLAN traffic and supports only MSTP as the L2CP (enabled by default) with default settings such as bridge MAC as MSTP region name, all VLANs mapped to CIST and no Multiple Spanning Tree Instance (MSTI).
2. A non-configured node that rejects and drops all VLAN traffic and supports only MSTP as the L2CP (enabled by default) with default settings such as bridge MAC as MSTP region name, all VLANs mapped to CIST and no MSTI.

3. A non-configured node that accepts and forwards all VLAN traffic and supports only ERP as the L2CP (disabled by default) and due to the use of ERP, manual configuration of the ring ports is required.

4. A non-configured node that rejects and drops all VLAN traffic and supports only ERP as the L2CP (disabled by default) and due to the use of ERP, manual configuration of the ring ports is required.

5. A non-configured node that accepts and forwards all VLAN traffic and supports both ERP and MSTP as the L2CP (both can be disabled by default as the installer must select one of them manually). Note that MSTP cannot be enabled by default, due to the lack of interoperability between MSTP and ERP.

6. A non-configured node that rejects and drops all VLAN traffic and supports both ERP and MSTP as the L2CP (both can be disabled by default as the installer must select one of them manually). Note that MSTP cannot be enabled by default, due to the lack of interoperability between MSTP and ERP.

Non-configured nodes of types 1, 2, 3 or 4 support only one kind of L2CP and thus only operate in one kind of Ethernet network (either an MSTP network or ERP network). Type 1 devices can be inserted into a network with bridged VLANs, but not P2P VLANs. This is because non-configured nodes cannot distinguish between P2P VLANs and bridging VLANs. As a result, P2P VLANs may be blocked by MSTP. If both working and protection VLANs of the same service are blocked by MSTP, a service interruption is caused. In addition, since in other nodes P2P VLANs are not blocked by the MSTP, incorrectly connecting the links of the new node may result in the creation of a loop in one or more of these VLANs, which then may cause a broadcast storm.

Inserting type 2 devices into a network may break bridged VLANs. This is because the MSTP protocol is not aware of the active VLAN topologies. In this case, MSTP may converge to a logical topology that uses the new node as a transient node for certain VLANs. As a result, those bridged VLANs will be split into two parts.

Figure 3:
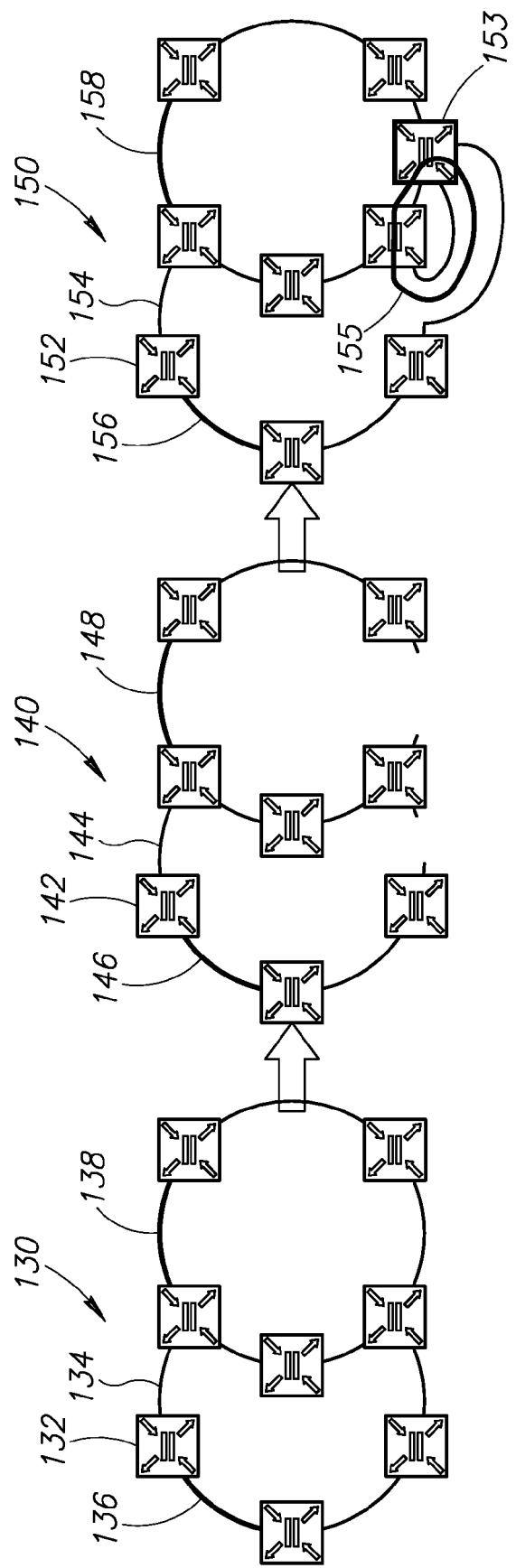
FIG. 3 is a diagram illustrating a super loop caused by a ring of rings.

Type 3 devices can be inserted into the network in most cases, but may cause a problem if not installed correctly. If installed incorrectly, one or more super loops may be formed in the ERP network, e.g., a ring of rings. This is illustrated in the three scenarios 130, 140, 150 in FIG. 3 where network 130 comprises NEs 132, links 134 and blocked Ring Protection Links (RPLs) 136, 138; network 140 comprises NEs 142, links 144 and unblocked Ring Protection Links (RPLs) 146, 148 (due to links being disconnected); network 150 comprises NEs 152, links 154, new node 153, blocked Ring Protection Links (RPLs) 156, 158 and super loop 155. Further, manual configuration of ERP networks are typically tedious and highly error prone.

Inserting type 4 devices into the network may break bridged VLANs. This is because the ERP protocol is not aware of the active VLAN topologies and each node is continuously monitoring the link status, reporting it to the RPL owner. Thus, in this case, once the links on new node are up and active, the RPL will be blocked. Meanwhile, all VLAN traffic on the new node is dropped. As a result, the bridged VLAN is split into two parts. Although the force-switch mechanism defined in ERP can protect the bridged VLANs before insertion by issuing a force-switch command on the two nodes neighboring the node to be inserted. A side effect of this, however, is the in-band management VLAN on new node is also blocked.

Note that a type 5 or 6 non-configured node is able to support both MSTP and ERP, but it requires extra configuration information and also suffers from the same problem described for node types 1, 2, 3 and 4.

In one embodiment, the problems described supra are avoided by pre-configuring everything before the new node is inserted into the network. The pre-configuration can include, e.g., L2CP configuration, VLAN to port mapping configuration, service configuration, etc., which can be tedious and error-prone due to human mistakes. With the growing complexity of the operator network, manual configuration even may sometimes be impossible for an installer with limited network knowledge.

In another embodiment, these configuration mistakes are avoided by adding intelligence to the NMS to perform an auto-configuration process. For example, the NMS can find the super loops by checking the physical topology discovered. The NMS can then generate the service configuration of the transit node automatically.

In one embodiment, only P2P services are supported wherein the only bridged VLAN is the management VLAN. In this case, the default configuration of a device is to have all VLANs disabled, except for the management VLAN which is configured for forwarding. When disconnecting a link between two nodes, all protected P2P services switch to use a path that does not go though that link (due to OAM identifying the failure over the path that goes through the failed link). The management VLAN is the only VLAN that is affected by the STP, and STP converges to make it operational. Upon insertion of the new node, STP converges again and the management plane continues to operate since its VLAN is already enabled on the new node. All the P2P services continue to use the paths that do not flow through the new node, since OAM still indicates that the path though that node is not working. Service traffic begins flowing through the new node only after it is configured by the NMS. This embodiment, however, has the drawbacks of (1) not supporting bridged services; and (2) only working with STP networks (and not ERP networks).

In a dynamic VLAN registration embodiment, GVRP/MVRP (as adopted by IEEE802.1q and IEEE802.1ad) to dynamically create the transient VLANs on the new node after the L2CP has converged. Currently, the L2CPs supported by GVRP/MVRP comprise STP, RSTP and MSTP. This embodiment, however, suffers from several limitations: (1) The dynamic VLAN registration process can take several seconds whereby service traffic is interrupted during this period; (2) the supported L2CP does not include ERP (whose main advantage is fast convergence); (3) the network installer still needs to know which type of L2CP is used and must enable it before inserting the new node into the network; (4) P2P VLANs are not supported; and (5) traffic parameters (e.g., policers, shapers, etc.) are not supported.

In another embodiment, an installer inserts a new node into a provider bridged network using MSTP as follows: (1) boot up the device and configure basic parameters such as in-band management IP address, gateway address, management VLAN, etc.; (2) disconnect the link connecting the two devices between which the new node is to be inserted; (3) the MSTP re-converges and all E-LAN services including management VLANs are protected; (4) for E-Line services whose active path uses the disconnected link, a Continuity Checking Message (CCM) loss will be detected, and after a certain time period (e.g., 3.5*CCI), the other path switches automatically; (5) connect a single cable to the new node (because (a) the new node is not configured and it is not desired to have MSTP use this node as a transit node for any E-LAN service, and (b) MSTP is performing calculations based on physical topology and it is not yet aware of any VLAN configuration for the network); (6) contact the network administrator to trigger NMS configuration of the new node; (7) wait until confirmation from the network administrator that the NMS successfully configured the new node; and (8) connect the other cable to the new node allowing service traffic to flow.

A drawback of this embodiment is that it requires the network installer to monitor the entire configuration process for the new node even though the configuration is performed automatically by the NMS. The network installer is also required to coordinate with the network administrator when performing the installation, which typically leads to low network operation efficiency.

Figure 4:
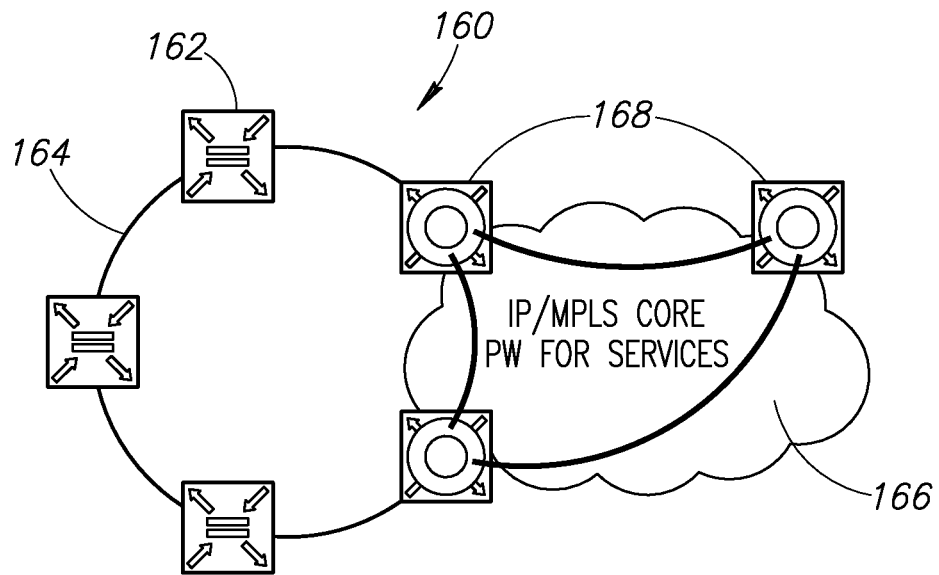
FIG. 4 is a diagram illustrating an example open ERP ring without a virtual channel.
Figure 5:
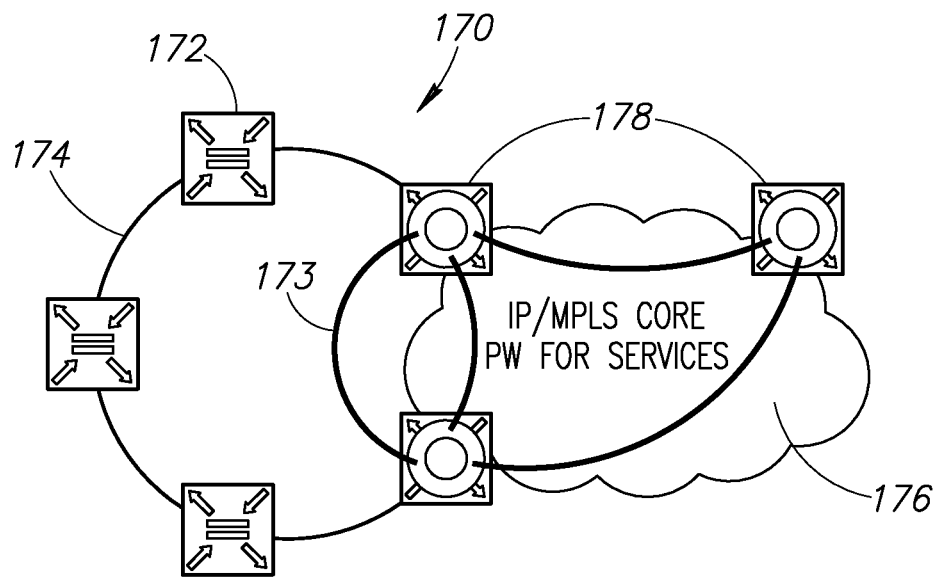
FIG. 5 is a diagram illustrating an example open ERP ring with a virtual channel.

Note that the embodiment described supra can also apply to ERP networks, but is limited to networks with closed ring topologies and open ring topologies with R-APS virtual channels 170 (FIG. 5) comprising modes 172, links 174, logical link 173, IP/MPLS core 176 and VSI nodes 178. For open ERP rings 160 as shown in FIG. 4 without R-APS virtual channels, this embodiment will not work. This is because, in an ERP network as in FIG. 4, each node 162 by itself monitors and broadcasts the physical link status to other nodes along the entire ring via links 164. When the link is disconnected, the two nodes formerly connected by this link start sending R-APS(SF) messages along the ring and the RPL owner of the ring unblocks the RPL. When one of these two nodes is connected to the new node to be inserted, it stops sending Ring Automatic Protection Switching (Signal Failure) (R-APS(SF)) message due to the link being recovered, but the other node keeps sending R-APS(SF), messages as the new node is connected with a single cable. This scheme is satisfactory for closed ring networks, as R-APS(SF) message arrive at the RPL owner on the R-APS channel and the RPL will remain unblocked. For open rings without R-APS virtual channels, the R-APS channel is split into two parts when any link is disconnected and one part of the link does not receive any R-APS(SF) messages. If the RPL owner is located on the part of the link that does not receive R-APS(SF) messages, the RPL will be blocked after a wait to restore (WTR) timeout; as a result, the new node will be unreachable by the NMS. In addition, during the WTR period, the link to the new node is still blocked according to standard protocol behavior and cannot be reached by the NMS.

In another embodiment, the need for the installer to coordinate with the network administrator during node insertion is eliminated we well as solving the limitation of the embodiment described supra which cannot handle open ERP rings without R-ASP virtual channels. The embodiment also ensures that no services are interrupted during the node insertion procedure even if installer related mounting errors are made.

In this embodiment, a node can be in either one or two modes: (1) partially configured mode and (2) fully configured mode. A partially configured mode is defined as a node that is not yet configured with the required configuration in order to be able to function as a transit node for every existing service in the network that needs to flow through it. In contrast, a fully configured node is defined as a node that is configured with the required configuration in order to be able to function as a transit node for every existing service in the network that needs to flow through it.

Figure 12:
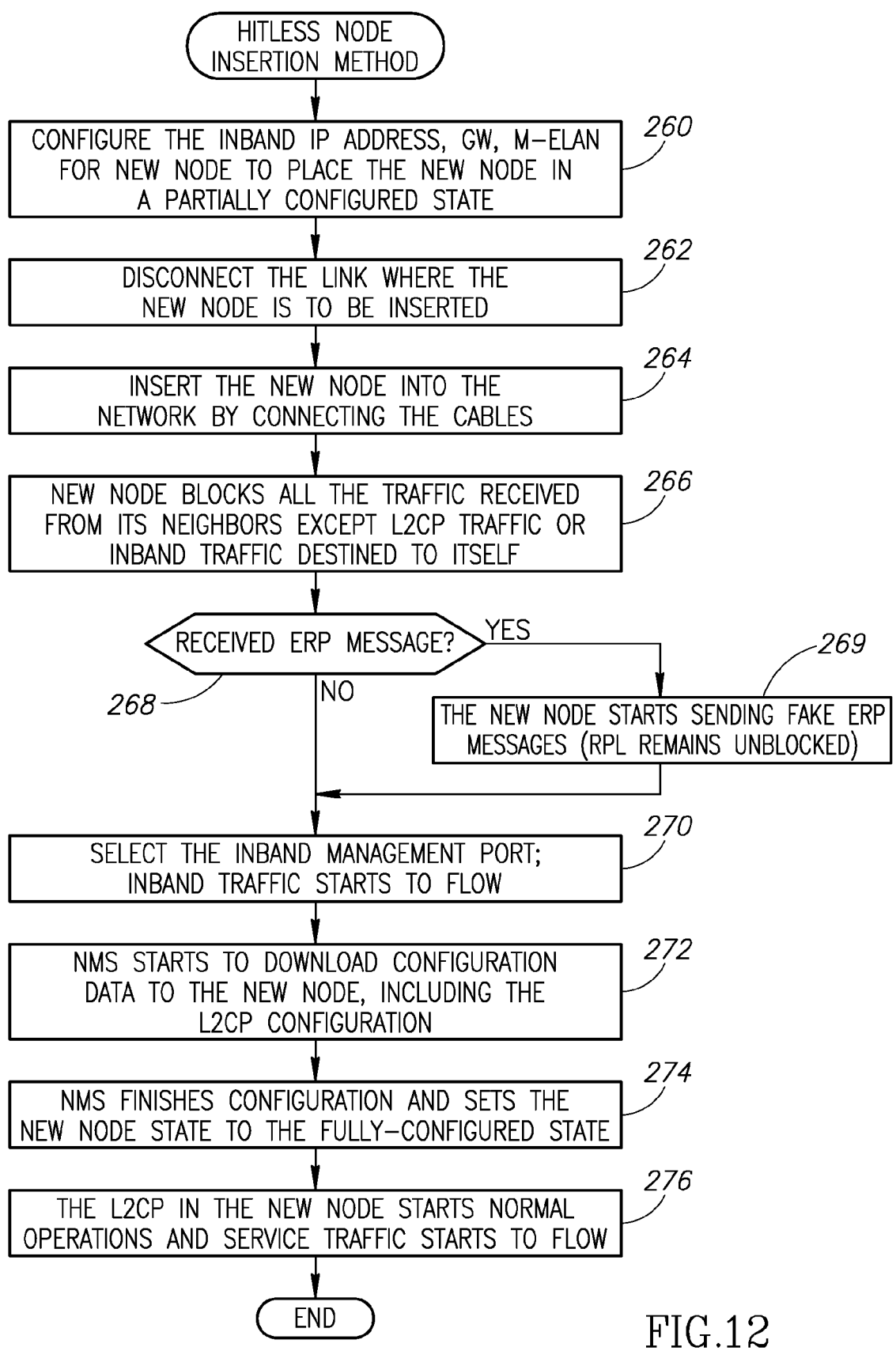
FIG. 12 is a flow diagram illustrating an example of the hitless node insertion method of the present invention.

A flow diagram illustrating an example of the hitless node insertion method of the present invention is shown in FIG. 12. A non-configured node is first placed in a partially configured mode of operation (step 260). In order to insert such a node into the network, an installer needs to first boot the device and configure the in-band management IP address, IP gateway and management VLAN.

Figure 6:
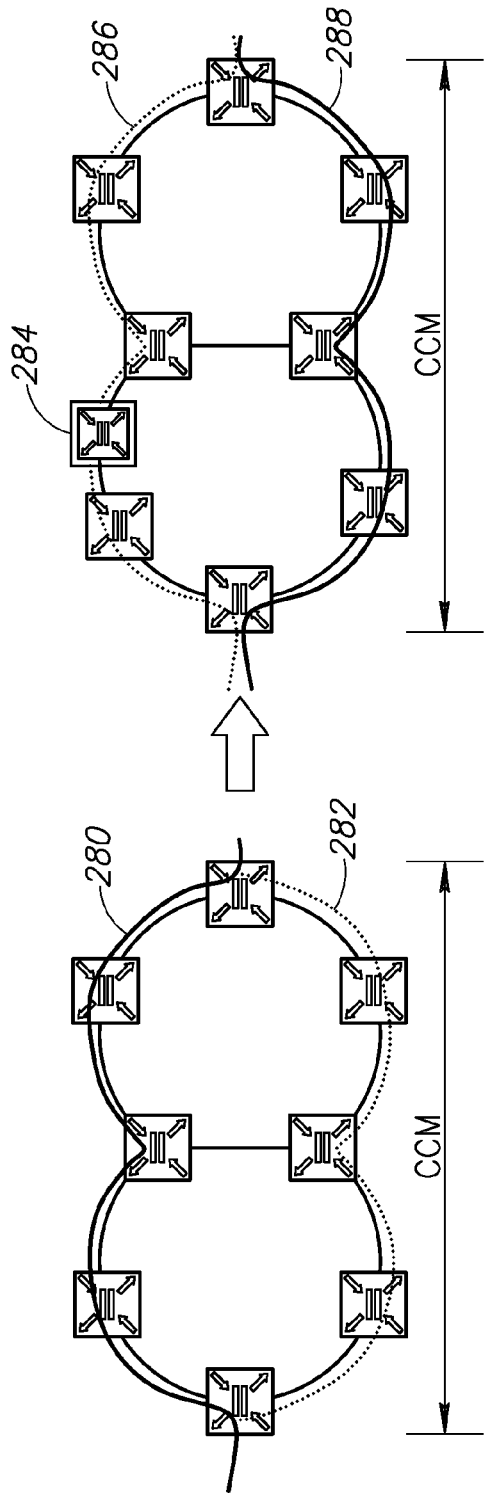
FIG. 6 is a diagram illustrating an example E-Line service protection during insertion of a node.

Then the installer disconnects the link to which the new node is to be inserted (step 262). As a result, each protected E-Line service, which has its active path through this link, switches to the alternate path after detecting CCM Loss (broadcast of link failure when the cable is disconnected). Note that alternatively, the operator can also manually switch the E-line services to use the path that does not go through the disconnected link and in this way avoid a transient failure. This is illustrated in FIG. 6 where the working path 280 is represented as a solid line and the protection path 282 is represented by the dotted line. After insertion of the new node 284, the protection path 286 is represented by the dotted line and the working path 288 is represented by the solid line.

Figure 7:
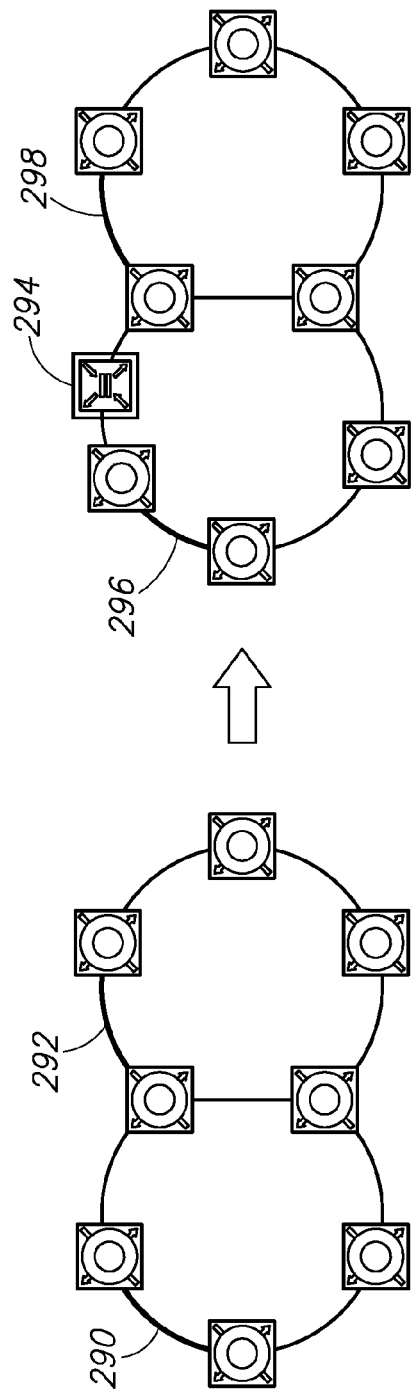
FIG. 7 is a diagram illustrating an example E-LAN service protection during insertion of a node in an ERP network.
Figure 8:
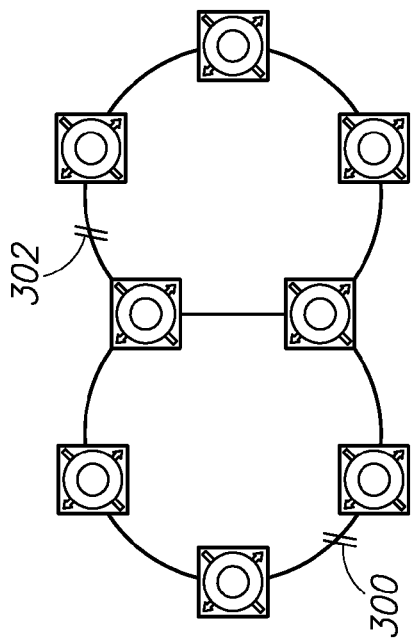
FIG. 8 is a diagram illustrating an example E-LAN service protection during insertion of a node in a MSTP network.

For E-LAN services, the L2CP is operative to recreate the logical topology after it detects the link failure. This is illustrated in FIGS. 7 and 8. In FIG. 7, the blocked RPL links are referenced 290, 292, 298 and the unblocked RPL link is referenced 296, and the node to be inserted is referenced 294. In FIG. 8, blocked ports are referenced 300, 302, 306 and the node to be inserted is referenced 304.

The installer then inserts the node into the network and connected all cables (step 264). To avoid interfering with the any existing service in network, the new node in the partially configured mode functions as a management host only and not as a switch. Thus, the new node blocks all VLANs on all ports and only broadcasts and MAC-to-me packets in the management VLAN are trapped to the CPU (step 266). This ensures that no traffic loops are created in the event one or more cables are misconnected.

For MSTP networks, all Bridging Protocol Data Units (BPDUs) received by the new node are discarded and the MSTP network converges as if the links to the new node are edge links. The new node is seen as an end station (i.e. PC), which does not relay any packets.

If an ERP network is detected (step 268) such as receiving an ERP message, it is desired that the new node transmit the R-APS(SF) message along the ring in order to keep the RPL unblocked (step 269). Initially, the non-configured new node does not know which VLAN the R-APS channel is using and which links belong to which ERP rings. Thus, the new node snoops the R-APS messages arriving on each network link and sends them to the CPU. The CPU analyzes the required information for crafting an R-APS(SF) message (i.e. false or fake message) for transmission over each of these links. Subsequently, the new node continuously sends the respective fake R-APS(SF) message over the ports where it initially received an R-APS message until the new node changes to the fully configured mode by the NMS.

In the case of a sub-ring topology, on a master ring, the ring port may receive ERP messages from different VLANs but only one of VLANs is the R-APS channel of the master ring. This is the VLAN the crafted R-APS(SF) messages are sent out on. In one embodiment, the VLANs are distinguished from each other by utilizing the wait-to-restore (WTR) mechanism of ERP. After the new node is inserted into the master ring, it starts the WTR mechanism. Both the ring ports which face the new node and belong to the two neighbouring nodes will be blocked. The blocking port will block all traffic, except the R-APS messages initiated by this neighbouring node. In other words, if the new node received R-APS messages during the WTR period, it must be from its direct neighbours and the VLAN of the received R-APS message must be the master ring's control VLAN.

Further, because the new node is connected to the network through more than one bridge port, there is a need to select only one bridge port to be the in-band management port (step 270). There are several ways to accomplish this.

In one embodiment, the port is actively chosen by sending ARP request messages to the default IP gateway via all active ports. The port over which the node first receives an ARP reply is selected to send the in-band management traffic. Subsequently, periodic ARP requests are sent over the selected port to monitor the connectivity between new node and the IP gateway. In the event a network impairment breaks the path from the new node to the IP gateway, the new node triggers reselection of the in-band management port.

In another embodiment, the sending port is passively selected to be the port over which the node first receives a packet from the in-band management VLAN with a source MAC address matching the default IP gateway. Note that all ports can be receiving ports for in-band traffic. A timer is added to age out the selected port for each MAC address in the event a network impairment breaks the path from new node to the IP gateway. Each received packet from the in-band management VLAN on the chosen port resets the respective timer. Once the timer timeouts, the new node re-selects the port in the manner described supra. The advantage of using a timer is it provides resiliency for in-band management connectivity when the node is in the partially configured mode. A disadvantage is that the new node receives duplicate packets for Broadcast, Unknown unicast, and Multicast (BUM) traffic. The partially configured new node, however, only uses a limited number of protocols, such as ARP, Telnet, SNMP, etc. ARP is used to translate the IP address into a MAC address and it is robust to packet duplication by nature. Telnet uses TCP protocol as the transport layer and handles packet duplication. SNMP is more complicated as it can use either TCP or UDP as the transport layer protocol. If the NMS uses SNMP over TCP, TCP handles the packet duplication in the transport layer. If the NMS uses SNMP over UDP, the application layer needs to handle the packet duplication. This means when the NMS uses SNMP over UDP, there is a need for the NMS to only accept the first reply and ignore subsequent replies.

At this point, the network administrator triggers the downloading of configuration information to the new node via the NMS as desired (step 272). Once configuration download is complete, the new node changes to the fully configured state (step 274). The L2CP on the new node starts participating in the L2CP as normal, all E-LAN services start operation under the control of the L2CP and all E-Line services start to revert back to using the path through the new node (step 276).

In one embodiment, the management functionality and control plane functionalities of the hitless node insertion mechanism are implemented software (e.g., CPU, DSP, etc.), via the data plane functionalities in hardware (e.g., ASIC, FPGA, NP, etc.) or a combination of software and hardware.

In one embodiment, the management functionality comprises the partially-configured mode and fully-configured mode described supra. The control plane functional blocks comprise process trapped R-APS messages and continuously replying with crafted (i.e. fake) R-APS(SF) messages when the node is in the partially-configured mode.

In one embodiment, the data plane functional blocks comprise (1) blocking all VLANs; (2) trapping R-APS messages from connected ports to the CPU; (3) discarding all received BPDUs; and (4) implementing in-band management port selection via one of three ways. In a first option, the in-band management port is manually selected, e.g., by manual configuration.

In a second option, the in-band management port is selected by (a) sending an ARP request over all active ports, and selecting the port that first receives the ARP reply as the in-band management port; (b) sending periodic ARP request messages on the selected in-band management port in order to monitor the connectivity between the new node and the default IP gateway; and (c) triggering the re-selection of in-band management port if packet loss is detected on an ARP reply (e.g., more than three continuous ARP replies lost).

In a third option, the in-band management port is selected by (a) trapping all broadcast and MAC-to-me packets from the in-band management VLAN to the CPU, regardless of the received port; (b) selecting the port to send in-band management traffic based over as the port that first receives an in-band management packet from the next-hop router; and (c) maintaining a timer for the port selected for sending in-band management traffic, resetting the timer each time it receives an in-band management packet from the next-hop router on that port and when the timer timeouts, triggering the re-selection of the port over which in-band management traffic is sent.

Figure 9:
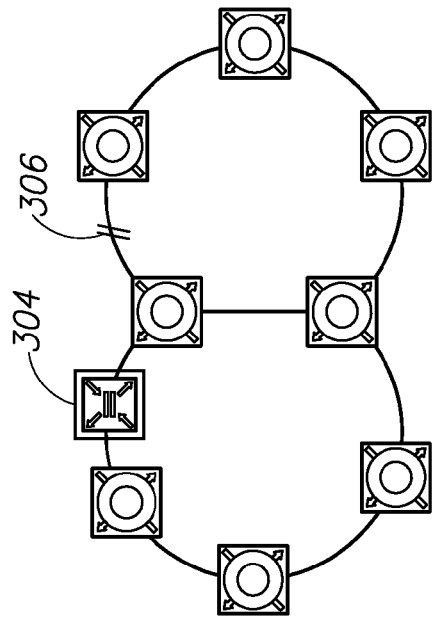
FIG. 9 is a diagram illustrating an example insertion of a single node into a single ERP ring.
Figure 9:
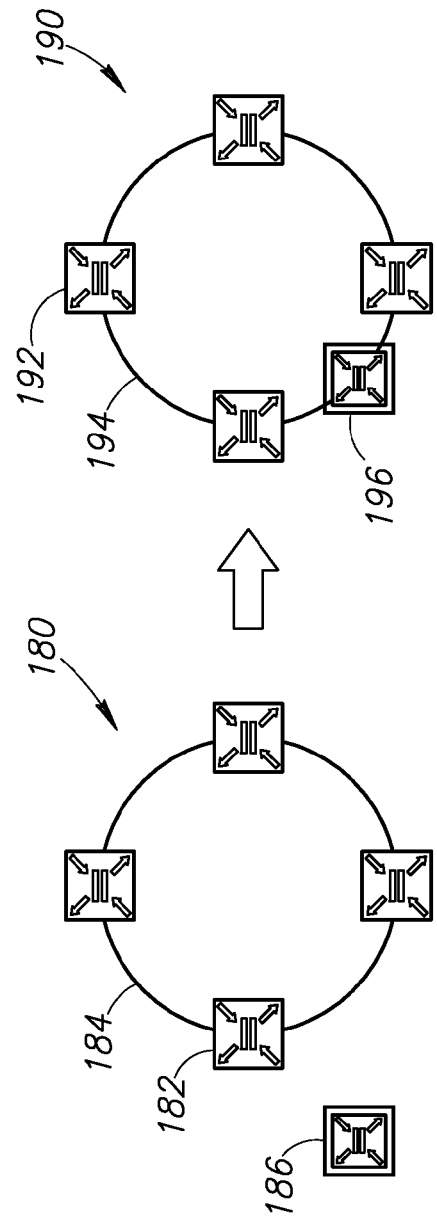

The hitless node insertion mechanism has numerous applications, such as inserting a new node into a single ring as shown in FIG. 9 where the single ring 180 comprises a plurality of nodes 182 and links 184. Ring 190 comprises a plurality of nodes 192 and links 194 and new node 196 inserted in accordance with the mechanism of the invention. Note that the application of the invention is valid for both ERP and MSTP networks.

Figure 10:
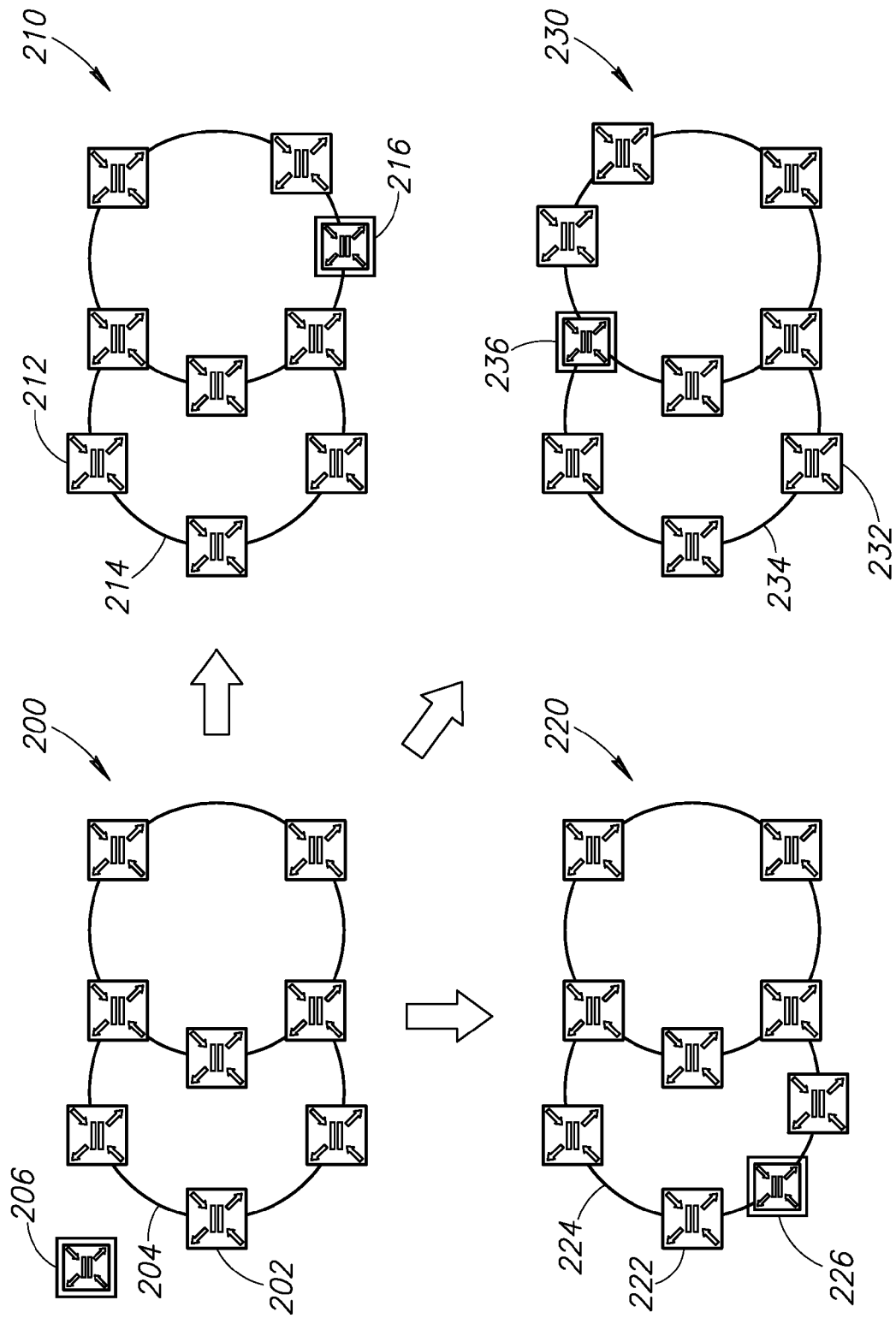
FIG. 10 is a diagram illustrating an example insertion of a single node into a tree of rings.

The mechanism is also applicable to insertion of one node into a tree of rings as shown in FIG. 10 wherein ring 200 comprises a sub-ring and major (master) ring having a plurality of nodes 202 and links 204. The node to be inserted is referenced 206. In one example embodiment, the node 226 to be inserted is added to ring network 220 comprising a plurality of nodes 222 and links 224. The new node 226 is added to the sub-ring (left portion of network 220). In another example embodiment, the node 216 to be inserted is added to the master ring of ring network 210 which comprises a plurality of nodes 212 and links 214. In yet another example embodiment, the node 236 to be inserted is added to both the sub-ring and master ring of ring network 230 which comprises a plurality of nodes 232 and links 234. In this case, the inserted node 236 snoops ERP messages from both sub-ring and master ring to obtain VLAN IDs from both rings. Note that in all three of the above example embodiments, the application of the mechanism is valid for both ERP and MSTP networks.

Figure 11:
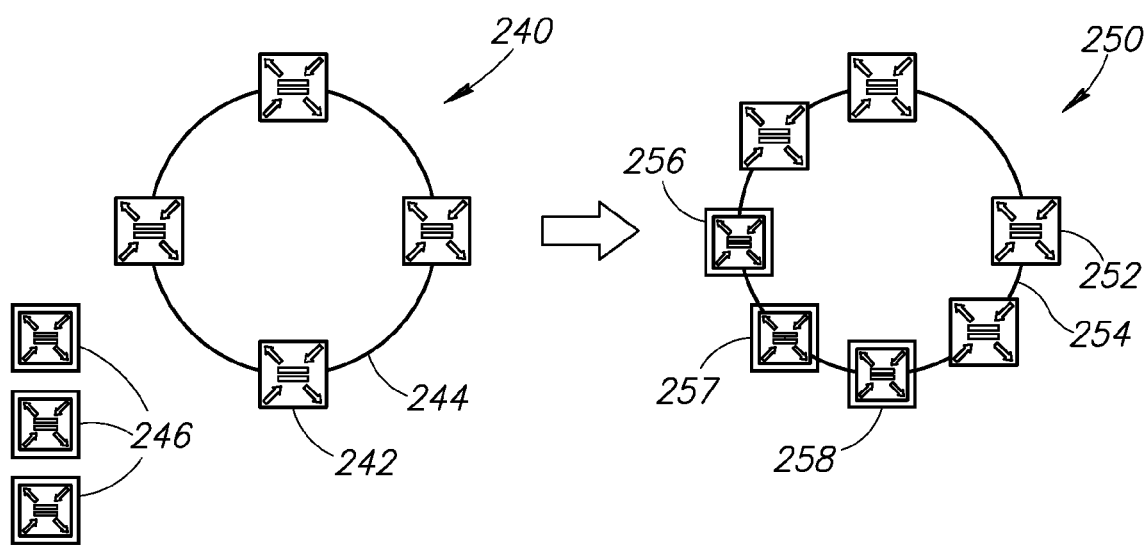
FIG. 11 is a diagram illustrating an example insertion of a plurality of adjacent nodes into an existing network.

The mechanism is also applicable to insertion of a plurality of nodes into an existing network as shown in FIG. 11 wherein ring 240 comprises a plurality of nodes 242 and links 244, with nodes 246 to be inserted. In this case, nodes 256, 257, 258 are inserted but they are not configured simultaneously. Due to the limitation of requiring communications with the NMS, each node is configured one by one. Thus, for example, node 256 (neighbouring an existing node in the ring) is configured first, following by node 257 and then node 258. Note that the application of the invention is valid for any legal topology for both ERP and MSTP networks.

Several advantages of the hitless node insertion mechanism of the present invention include (1) eliminating the need for an installer to coordinate with a network administrator during node insertion; (2) solving the limitation of prior solutions which cannot handle open ERP rings without R-ASP virtual channels; (3) support for batch insertion of multiple adjacent nodes; (4) supporting automatic configuration by the NMS, which significantly reduces the work required of the technician and network operator when adding a new node to the network and dramatically reduces the potential for configuration mistakes; and (5) handling installer mistakes and protecting the network from damage by such mistakes; and (6) supporting both ERP and MSTP networks without the requirement that the installer have knowledge of what kind of network the new node is being inserted into.

Switch Embodiment Incorporating Hitless Node Insertion Mechanism

A switch device can be adapted to incorporate the hitless node insertion mechanism. Hardware means and/or software means adapted to execute the mechanism may be incorporated within a network device, typically a core switch. It is appreciated that the mechanism may be implemented in a core switch, provider edge switch, Network Management System, Label Switching Router (LSR), Ethernet LAN switch, network switch or any other wired or wireless network device. The device may be constructed using any combination of hardware and/or software.

Figure 13:
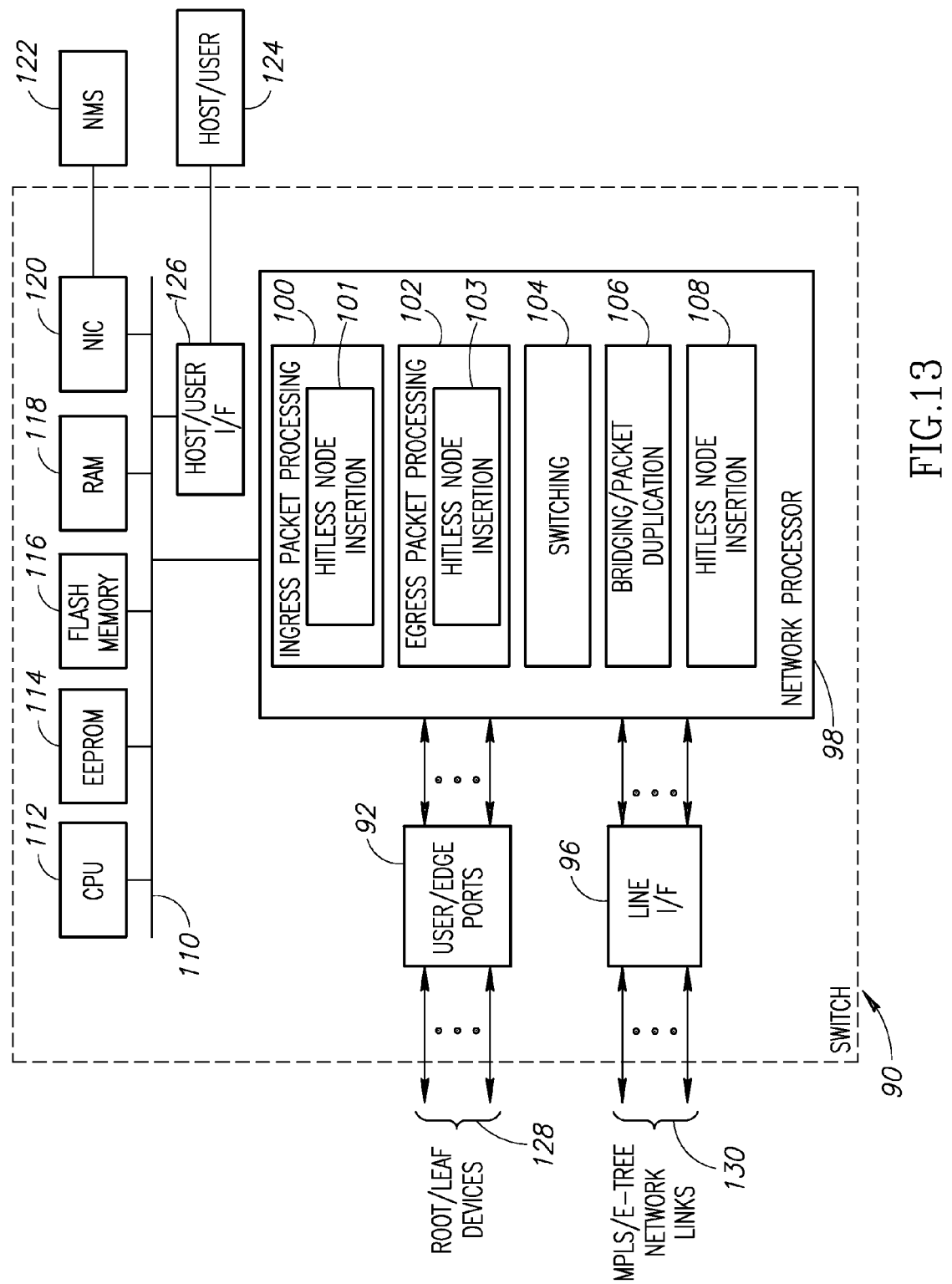
FIG. 13 is a functional block diagram illustrating an example switch incorporating the hitless node insertion mechanism of the present invention.

A block diagram of an example switch incorporating the hitless node insertion mechanism of the present invention is shown in FIG. 13. The switch, generally referenced 90, comprises at its core a network processor 98, link or network interface ports 96, edge or user ports 92, a network interface 120 for interfacing the switch to an NMS 122, a central processor 112, e.g., CPU, and both volatile and non-volatile memory including RAM memory 118 for storing data and application program code, Flash memory 116 for storing boot and application code and EEPROM 114 for storing configuration data. The CPU communicates to the network processor, memory peripherals and other support devices via a bus 110.

The switch 90 comprises a user side and a network side. The one or more line interface cards containing network ports 96 provide the PHY interface to two-way communication links 130. As an example, the line interface cards may be adapted to interface to any combination of the following communication links: any variety of copper or optical based Ethernet, Token Ring, FDDI, SONET/SDH, ATM, RPR, etc.

A plurality of edge ports 92 is provided for connecting directly or indirectly to any number of root and leaf devices via links 128. The edge ports interface to the root or leaf device via any suitable type of interface, e.g., Gigabit Ethernet (GE), Fast Ethernet (FE), LOGE, SONET/SDH, PDH interface (e.g., T1/E1), etc. Likewise, the network side interfaces to MPLS domain devices and/or other E-Tree devices via any suitable interface such as Optical Ethernet (e.g., 1GE, 10GE, etc.), TDM SONET/SDH/PDH, RPR, etc.

A plurality of switches may be connected to each other to form an E-Tree domain, ERP ring network, MSTP ring network, etc. whereby one or more of the switches are connected to MPLS core switches. In this case, connections may be built using both VPLS and MPLS based technology. Alternatively, the E-Tree domain may comprise a single MPLS switch and a plurality of E-domain devices connecting any number of roots and leafs, such as in a ring topology.

The network processor 98 implements the switching fabric (switching block 104) for providing the switching functionality of the device and bridging/packet duplication functions (block 106). Depending on the specific implementation, the switching fabric may comprise, for example, hardware for performing VLAN tagging, MPLS, Frame Relay, ATM switching, CSIX or any other fabric to network interface protocol. The network processor includes one or more packet processing engines (PPE) that comprises an ingress packet processor 100 and an egress packet processor 102. The network processor also comprises timestamp circuits, clock circuits, memory, counters and CPU interface (not shown), means for performing OAM protocol (e.g., ITU Y.1731, IEEE 802.1ag, etc.) processing (part of this capability may reside in the CPU as well). The network processor may be implemented as a microcontroller, microprocessor, microcomputer, ASIC core, FPGA core, central processing unit (CPU) or digital signal processor (DSP) or any other suitable computing means.

The switch also comprises a NIC 120 for providing an out of band interface for connecting to external entities such as a craft for local maintenance and configuration purposes, an NMS for centralized provisioning, administration and control or a Local Area Network (LAN). The switch may comprise additional interfaces, such as a serial interface for connecting to a PC for configuration purposes and an interface to an NMS for in-band management.

The central processor 112 implements the major functionality of the switch including higher software layer processing, and in one embodiment implements the hitless node insertion mechanism of the invention. Note that the central processor may be implemented in any suitable manner such as a microcontroller, microprocessor, microcomputer, ASIC core, FPGA core, central processing unit (CPU) or digital signal processor (DSP) or any other computing means.

The client edge ports and network ports may be implemented on one or more line interface cards that provide the PHY interface to bidirectional communication links, in addition to the MAC interface. Note that the invention is not limited to any particular line interface type or link speed. In addition, the invention is not limited to any particular number of user or network ports, as any number of links of each type may be used. Further, the line interface cards may be adapted to interface to any type of communication links such as any variety of copper or optical based Ethernet, Token Ring, FDDI, SONET/SDH, PDH, ATM, RPR, etc.

The switch also comprises an optional user interface adapted to respond to user inputs and provide feedback and other status information. A host/user interface 126 enables communication with a user or host-computing device 124. The host may be adapted to configure, control and maintain the operation of the device. The switch may also comprise magnetic storage device means for storing application programs and data.

The switch comprises computer readable storage medium for storing program code and data which may include any suitable memory means including but not limited to magnetic storage, optical storage, CD-ROM drive, ZIP drive, DVD drive, DAT cassette, semiconductor based volatile or nonvolatile memory, biological memory devices, or any other memory storage device.

Note that a network core device may have the same structure as a provider edge device, except for example, not having a user/edge (UNI) port for connecting to client and/or access devices, and having a higher port density and bandwidth capacity.

Software operative to implement the functionality of the hitless node insertion mechanism may be adapted to reside on a computer readable medium, such as a magnetic disk within a disk drive unit or any other volatile or nonvolatile memory. In this example switch, the software adapted to implement the portion of the hitless node insertion mechanism that executes on the network processor is implemented within the ingress packet processing block 100 (depicted in block 101) and within the egress packet processing block 102 (depicted in block 103) or as a separate module 108. For example, a table, maintained by the CPU, can be used in performing ingress and egress processing. The table comprises VPLS, MPLS and VSI related MAC address and other information including VLAN address translation information. Alternatively, the computer readable medium may comprise a floppy disk, Flash memory, EPROM, EEPROM based memory, ROM storage, etc. The software adapted to perform mechanisms or any portion thereof may also reside, in whole or in part, in the static or dynamic main memories or in firmware within the processor of the switch (i.e. within microcontroller, microprocessor, microcomputer, DSP, etc. internal memory).

In alternative embodiments, the methods of the present invention may be applicable to implementations of the invention in integrated circuits (ICs), field programmable gate arrays (FPGAs), chip sets or application specific integrated circuits (ASICs), DSP circuits, wireless implementations and other communication system products.

The terminology used herein is for the purpose of describing particular embodiments only and is not intended to be limiting of the mechanism. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the mechanism has been presented for purposes of illustration and description, but is not intended to be exhaustive or limited to the mechanism in the form disclosed. As numerous modifications and changes will readily occur to those skilled in the art, it is intended that the mechanism not be limited to the limited number of embodiments described herein. Accordingly, it will be appreciated that all suitable variations, modifications and equivalents may be resorted to, falling within the spirit and scope of the mechanism. The embodiments were chosen and described in order to best explain the principles of the mechanism and the practical application, and to enable others of ordinary skill in the art to understand the mechanism for various embodiments with various modifications as are suited to the particular use contemplated.

What is claimed is:

1. A method of configuring a new node to be inserted into an Ethernet network, said method comprising:
   pre-configuring said new node into a partially configured state, disconnecting a network link where said new node is to be inserted and connecting said new node to at least one end of said disconnected link;
   blocking all data traffic received from neighboring nodes, but trapping Layer 2 Control Protocol (L2CP) traffic and in-band traffic destined to said new node;
   generating and sending fake signal failure (SF) messages if Ethernet Ring Protection (ERP) messages are detected;
   selecting an in-band management port; and
   receiving a configuration from a Network Management System (NMS) and once configuration of said new node is complete, setting said new node to a fully configured state.

2. The method according to claim 1, wherein pre-configuring said new node into a partially configured state comprises configuring in-band management Internet Protocol (IP) address, IP gateway address and management Virtual Local Area Network (VLAN).

3. The method according to claim 1, wherein said new node blocks all data traffic but traps and processes Ring Automatic Protection Switching (RAPS) messages.

4. The method according to claim 1, wherein selecting an in-band management port is performed manually.

5. The method according to claim 1, wherein selecting an in-band management port is performed utilizing an Automatic Protection Switching (APS) mechanism.

6. The method according to claim 1, wherein selecting an in-band management port is performed by trapping of in-band management Virtual Local Area Network (VLAN) packets.

7. The method according to claim 1, wherein generating and sending fake signal failure (SF) messages is operative to keep one or more Ring Protection Links (RPLs) unblocked.

8. The method according to claim 1, wherein said configuration received from said NMS comprises a Layer 2 Control Protocol (L2CP) configuration.

9. The method according to claim 1, wherein said new node begins handling service traffic after said new node is in a fully configured state.

10. A method of configuring a new node to be inserted into an Ethernet network, said method comprising:
    pre-configuring said new node into a partially configured state and detecting insertion into said Ethernet network;
    blocking all service traffic received from neighboring nodes except Layer 2 Control Protocol (L2CP) traffic or in-band traffic destined to said new node;
    generating and sending false signal failure (SF) messages to keep one or more Ring Protection Links (RPLs) unblocked while said new node is in said partially configured state if Ethernet Ring Protection (ERP) messages are detected;
    selecting one of a plurality of bridge ports in said new node as an in-band management port; and
    receiving a configuration from a Network Management System (NMS) and once configuration of said new node is complete, setting said new node to a fully configured state and beginning to handle service traffic.

11. The method according to claim 10, wherein pre-configuring said new node into a partially configured state comprises configuring in-band management Internet Protocol (IP) address, IP gateway address and management Virtual Local Area Network (VLAN).

12. The method according to claim 10, wherein said in-band management port is selected manually.

13. The method according to claim 10, wherein selecting said in-band management port comprises sending an Address Resolution Protocol (ARP) request on all active ports and selecting the port which is the first to receive a reply.

14. The method according to claim 13, further comprising:
    sending periodic ARP request messages on said selected in-band management port to monitor the connectivity between said new node and a default gateway; and
    triggering reselection of said in-band management port if packet loss is detected on an ARP reply.

15. The method according to claim 10, wherein selecting said in-band management port comprises:
    trapping all broadcast and MAC-to-me packets from in-band management VLAN regardless of the receiving port; and
    selecting said in-band management port in accordance with the port to first receive an in-band management packet from a next-hop router.

16. The method according to claim 15, further comprising:
    maintaining a timer for the selected in-band management port for sending in-band management traffic;

resetting said timer when an in-band management packet is received from said next hop router on that port; and triggering reselection of said in-band management port for sending in-band management traffic upon timeout of said timer.

17. A network device for use in a carrier Ethernet network, said network device comprising:
- a plurality of network ports for interfacing to one or more communication links of the network;
- a group of processors including a network processor and a central processor; and
- a non-transitory memory storing executable program code which when executed by the group of processors performs the following:
- receives pre-configuration information via the plurality of network ports for placing the group of processors into a partially configured state;
- blocks all data traffic received via the plurality of ports from neighboring nodes except for Layer 2 Control Protocol (L2CP) traffic and in-band traffic destined to the group of processors;
- generates and sends fake signal failure (SF) messages if Ethernet Ring Protection (ERP) messages are detected;
- selects an in-band management port from said plurality of ports which receives a configuration from a Network Management System (NMS) and once configuration of the group of processors is completed, then designates the plurality of processors as being in a fully configured state.

18. The network device according to claim 17, wherein said pre-configuration information includes an in-band management Internet Protocol (IP) address, an Internet Protocol gateway address, and a management Virtual Local Area Network (VLAN).

19. The network device according to claim 17, wherein said executable program code causes the in-band management port to be selected in response to a manual configuration.

20. The network device according to claim 17, wherein said executable program code causes an Address Resolution Protocol (ARP) mechanism to be used when selecting the in-band management port.

21. The network device according to claim 17, wherein said executable program code causes the in-band management port to be selected by trapping in-band management Virtual Local Area Network (VLAN) packets.

22. The network device according to claim 17, wherein said executable program code causes the fake signal failure (SF) messages to be generated and sent to keep one or more Ring Protection Links (RPLs) unblocked.

23. The network device according to claim 17, wherein the group of processors is configured to begin handling service traffic once the group of processors is placed in the fully configured state.

24. A network device to be inserted into an Ethernet network, said network device comprising:
- a plurality of network ports for interfacing to one or more communication links of the network;
- a group of processors including a network processor and a central processor, the network processor connected to the network ports, the network processing including an ingress packet processor and an egress packet processor; and
- a non-transitory memory storing executable program code and data;
- the central processor connected to the network processor, the central processor unit connected to the memory;
- the executable program code, when executed by the group of processors, performing the following:
- pre-configuring the group of processors into a partially configured state and detecting insertion into said Ethernet network;
- blocking all service traffic received via the plurality of ports from neighboring nodes except Layer 2 Control Protocol (L2CP) traffic and in-band traffic destined to the group of processors;
- generating and sending false signal failure (SF) messages to keep one or more Ring Protection Links (RPLs) unblocked while the group of processors is in said partially configured state if Ethernet Ring Protection (ERP) messages are detected;
- selecting one of the plurality of ports as an in-band management port which receives a configuration from a Network Management System (NMS) and once configuration of the group of processors is completed, then designating the plurality of processors as being in a fully configured state and beginning to handle service traffic.

* * * * *